US009489204B2

(12) United States Patent
Tu et al.

(10) Patent No.: US 9,489,204 B2
(45) Date of Patent: Nov. 8, 2016

(54) METHOD AND APPARATUS FOR PRECALCULATING A DIRECT BRANCH PARTIAL TARGET ADDRESS DURING A MISPREDICTION CORRECTION PROCESS

(71) Applicant: QUALCOMM Incorporated, San Diego, CA (US)

(72) Inventors: Jiajin Tu, Austin, TX (US); Suresh K. Venkumahanti, Austin, TX (US); Brian R. Mestan, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 742 days.

(21) Appl. No.: 13/842,835

(22) Filed: Mar. 15, 2013

(65) Prior Publication Data

US 2014/0281440 A1    Sep. 18, 2014

(51) Int. Cl.
*G06F 9/38*    (2006.01)
*G06F 9/32*    (2006.01)

(52) U.S. Cl.
CPC ............. *G06F 9/3804* (2013.01); *G06F 9/324* (2013.01); *G06F 9/3806* (2013.01); *G06F 9/3812* (2013.01); *G06F 9/3846* (2013.01); *G06F 9/3861* (2013.01)

(58) Field of Classification Search
None
See application file for complete search history.

(56) References Cited

U.S. PATENT DOCUMENTS

| 5,442,756 A * | 8/1995 | Grochowski | G06F 9/30192 712/23 |
| 5,608,886 A * | 3/1997 | Blomgren | G06F 9/30174 711/172 |
| 5,974,543 A * | 10/1999 | Hilgendorf | G06F 9/3806 711/E12.02 |
| 6,014,734 A | 1/2000 | Tran et al. | |
| 6,061,786 A | 5/2000 | Witt | |
| 6,108,774 A | 8/2000 | Muthusamy | |
| 6,339,822 B1 | 1/2002 | Miller | |
| 7,266,676 B2 * | 9/2007 | Tran | G06F 9/3804 712/233 |
| 7,783,870 B2 * | 8/2010 | Levitan | G06F 9/3804 712/237 |
| 7,827,392 B2 * | 11/2010 | Smith | G06F 9/3844 712/238 |
| 8,006,070 B2 * | 8/2011 | Gschwind | G06F 9/3802 712/205 |
| 8,181,005 B2 | 5/2012 | Zuraski, Jr. et al. | |
| 8,443,171 B2 * | 5/2013 | Morris | G06F 9/3846 712/207 |
| 8,886,920 B2 * | 11/2014 | Olson | 712/237 |
| 2005/0268040 A1 * | 12/2005 | Lee | G06F 9/3804 711/125 |
| 2009/0024819 A1 * | 1/2009 | Fisher | G06F 12/0897 711/170 |

OTHER PUBLICATIONS

The Computer Engineering Handbook, Oklobdzija, V.G. , 2002, CRC Press, 3 pages.*

* cited by examiner

*Primary Examiner* — Eric Coleman
(74) *Attorney, Agent, or Firm* — Withrow & Terranova, PLLC

(57) ABSTRACT

An example method of storing a partial target address in an instruction cache includes receiving a branch instruction. The method also includes predicting a direction of the branch instruction as being not taken. The method further includes calculating a destination address based on executing the branch instruction. The method also includes determining a partial target address using the destination address. The method further includes in response to the predicted direction of the branch instruction changing from not taken to taken, replacing an offset in an instruction cache with the partial target address.

30 Claims, 5 Drawing Sheets

METHOD AND APPARATUS FOR PRECALCULATING A DIRECT BRANCH PARTIAL TARGET ADDRESS DURING A MISPREDICTION CORRECTION PROCESS

FIELD OF DISCLOSURE

The present disclosure generally relates to processors, and more particularly to storing an address in an instruction cache.

BACKGROUND

Many portable products, such as cell phones, laptop computers, personal digital assistants (PDAs) or the like, incorporate one or more processors executing programs that support communication and multimedia applications. A processor for such products conventionally has a hierarchical memory configuration with multi-levels of caches including an instruction cache, a data cache, and system memory. The processor may need to operate with high performance and efficiency to support the plurality of computationally intensive functions for such products.

Further, the processor may be pipelined and support execution of conditional branch instructions. The execution of a conditional branch instruction in a pipelined processor may stall the pipeline pending the determination of the condition. To avoid stalling the processor, some form of branch prediction may be employed early in the pipeline. The branch prediction may allow the processor to speculatively fetch and execute instructions based on a predicted branch behavior.

BRIEF SUMMARY

This disclosure relates to processors. Methods, systems, and techniques for storing an address in an instruction cache are provided.

According to an embodiment, a method of storing a partial target address in an instruction cache includes receiving a branch instruction. The method also includes predicting a direction of the branch instruction as being not taken. The method further includes calculating a destination address based on executing the branch instruction. The method also includes determining a partial target address using the destination address. The method further includes in response to the predicted direction of the branch instruction changing from not taken to taken, replacing an offset in an instruction cache with the partial target address.

According to another embodiment, an apparatus for storing a partial target address in an instruction cache includes a processor that is operable to receive a branch instruction. The processor is also operable to predict a direction of the branch instruction as being not taken. The processor is further operable to calculate a destination address based on executing the branch instruction. The processor is also operable determine a partial target address using the destination address. The processor is further operable to in response to the predicted direction of the branch instruction changing from not taken to taken, replace an offset in an instruction cache with the partial target address.

According to another embodiment, a non-transitory computer-readable medium has stored thereon computer-executable instructions for performing operations including receiving a branch instruction; predicting a direction of the branch instruction as being not taken; calculating a destination address based on executing the branch instruction; determining a partial target address using the destination address; and in response to the predicted direction of the branch instruction changing from not taken to taken, replacing an offset in an instruction cache with the partial target address.

According to another embodiment, an apparatus for storing a partial target address in an instruction cache includes means for receiving a branch instruction; means for predicting a direction of the branch instruction as being not taken; means for calculating a destination address based on executing the branch instruction; means for determining a partial target address using the destination address; and means for in response to the predicted direction of the branch instruction changing from not taken to taken, replacing an offset in an instruction cache with the partial target address.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit the corresponding reference number.

DETAILED DESCRIPTION

Figure 1:
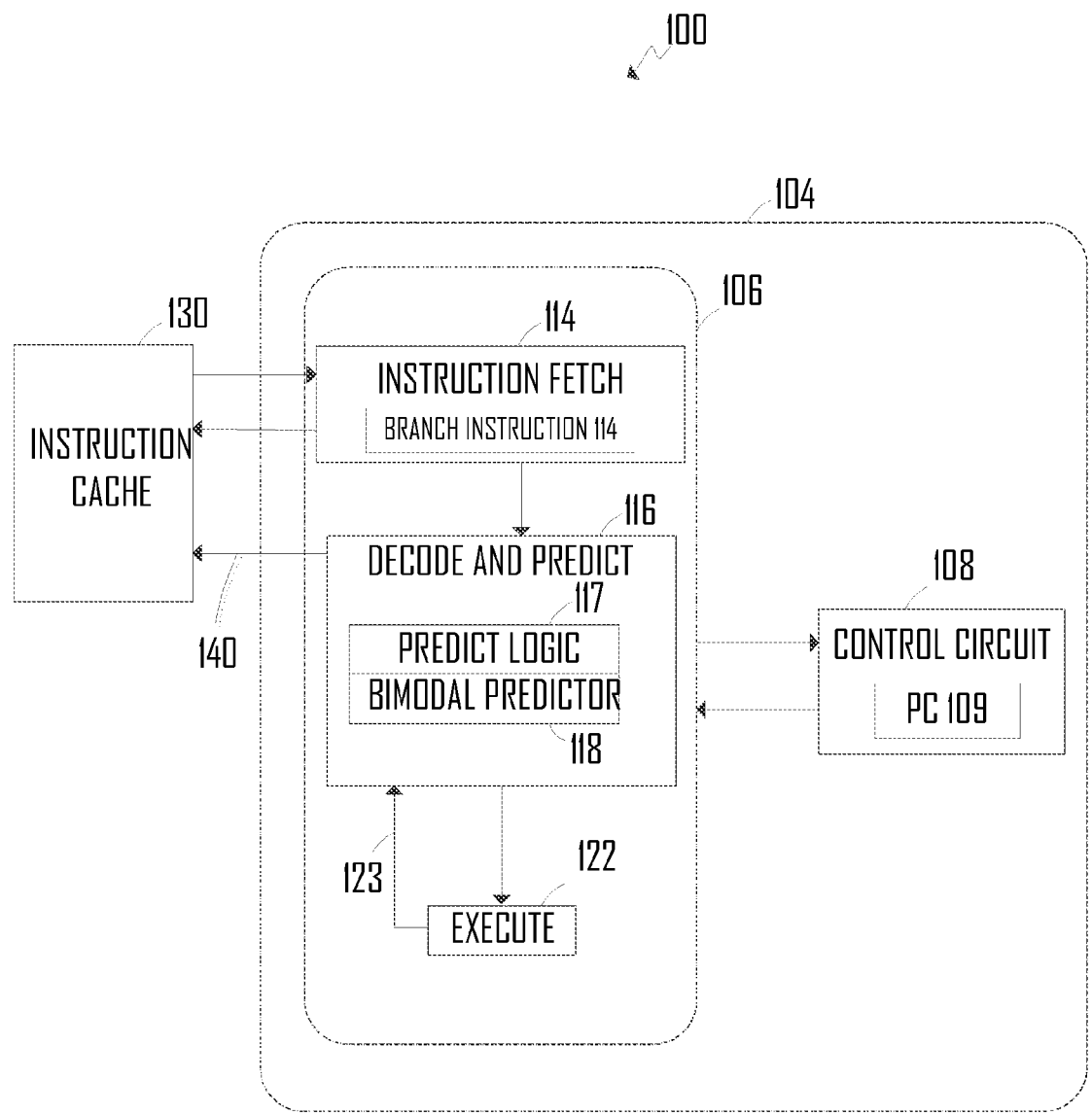
FIG. 1 is a block diagram illustrating a system for storing a partial target address in an instruction cache, according to an embodiment.

I. Overview
II. Example Processor Architecture
   A. Initialize Prediction Direction of Branch Instruction As Not Taken
   B. Calculate Partial Target Address
III. Change Predicted Direction of Branch Instructions
   A. Not Taken to Taken
   B. Taken to not Taken
   C. Maintain the Cache
   D. Bimodal Prediction
IV. Example Method
V. Example Wireless Device I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A processor may support execution of conditional branch instructions. A branch instruction may be a conditional jump instruction that directs program execution to a designated instruction that breaks the sequential program flow (branch instruction is taken) or to the next instruction (falls through).

The branch instruction may also be an unconditional jump instruction that always jumps to a new location in the program.

The destination address of a direct jump instruction may be calculated by adding the current program counter to the immediate offset included in the instruction. For example, an immediate offset may be bits [23:11] of a 32-bit encoding instruction and stored in a cache. This process of adding the current program counter to the immediate offset, however, may occupy a long timing delay. This may be especially true for 32-bit or 64-bit processors.

This disclosure provides techniques to quickly determine the destination address when the direction of the branch instruction is predicted as being taken. A partial target address of a direct jump instruction may be recalculated and replace the immediate offset in the cache. When the direct jump instruction is encountered, the partial target address in the cache may be used to determine the destination address of the direct jump instruction. Accordingly, when the direct jump instruction is encountered and the direct jump instruction is predicted as being taken, it may be unnecessary to add the current program counter to the immediate offset.

In a fixed-instruction length processor, the base address is easily loaded into the instruction cache via an interface between the instruction cache and outside memory (e.g., main memory, L2 cache, or L3 cache). This is because the base address may be easily determined in a fixed-instruction length processor. Thus, the partial address calculation may be determined by adding the known base address and offset.

In a dynamic-instruction length processor, however, the process of calculating and storing the partial address calculation is much more difficult. A reason for this difficulty is that in the dynamic-instruction length processor, the base address is not easily determined. In an example, for a very long instruction word (VLIW) processor, the instruction packet may contain a dynamic number of instructions, and the packet may cross cache lines. The program counter of the first instruction in the packet may calculate the jump instruction destination address. In cross cache line cases, however, the first instruction program counter may not be easily determined when the precalculation is performed. A complex method may be implemented to determine within a packet the first instruction program counter in another cache line. In a dynamic-instruction length processor, the immediate extension in one packet may be determined. If the extension is in a different cache line from the jump instruction, the base address is not easily identified in the instruction cache and the precalculation is very difficult to determine.

II. Example Processor Architecture

FIG. 1 is a block diagram illustrating a processor complex 100 for storing a partial target address in an instruction cache, according to an embodiment. Peripheral devices that may connect to processor complex 100 are not shown for clarity of discussion.

Processor complex 100 includes a processor 104 including a processor pipeline 106 and a control circuit 108 including a program counter (PC) 109. PC 109 may be a processor register that indicates where the processor is in its instruction sequence. Instructions may be retrieved sequentially from memory, and PC 109 may be incremented automatically after fetching an instruction. Some instructions may interrupt the sequential processing of the program flow by placing a new value in PC 109 such that an instruction different from the next sequential instruction in the program flow is executed.

Processor 104 is coupled to an instruction cache 130 (e.g., Level 1 instruction cache). Instruction cache 130 may optimize the fetching of instructions from, for example, main memory or an L2 cache, by storing instructions to be executed.

Processor pipeline 106 may include an instruction fetch stage 114, a decode and predict stage 116 having a predict logic circuit 117 and a bimodal predictor 118, and an execute stage 122.

Although four stages in processor pipeline 106 are shown, other embodiments having fewer than four or more than four stages are within the scope of this disclosure. Further, although a single processor pipeline 106 is shown, the processing of instructions using decode and predict stage 116 is applicable to superscalar designs and other architectures implementing parallel pipelines. For example, a superscalar processor designed for high clock rates may have two or inure parallel pipelines supporting multiple threads and each pipeline may divide instruction fetch stage 114, decode stage 116, and execute stage 122 into two or more pipelined stages increasing the overall processor pipeline depth to support a high clock rate. Also, for design, implementation, or other reasons, predict logic circuit 117 may be located elsewhere in processor 104. For example, predict logic circuit 117 may be located in control circuit 108.

In processor pipeline 106, instruction fetch stage 114 may be associated with program counter 109 and may fetch instructions from instruction cache 130 for processing by later stages. If an instruction fetch misses in instruction cache 130, meaning that the instruction to be fetched is not in instruction cache 130, the instruction may be fetched from a different memory system. In an example, the instruction is fetched from a Level 2 (L2) cache. In another example, the instruction is fetched from main memory. Further, instructions may be loaded into main memory or the L2 cache from other sources, such as a boot read-only memory (ROM), a hard drive, an optical disk, or from an external interface, such as a network.

In a decode stage 116, the fetched instruction is decoded, and in an execute stage 122, the instruction is executed. Result operands from execution stage 122 may take multiple execution cycles to determine a condition used by a conditional branch instruction. During these cycles, processor pipeline 106 may wait until the result operand is available.

When the branch instruction is in execute stage 122, the condition may be determined and the predict logic 117 may be informed over predict signal 123 to make forward transitions if the branch instruction is taken and to make reverse transitions if the branch instruction is not taken. The updated state is then passed over bit signal 140 to store the bimodal prediction bits in the associated branch instruction at a next available write cycle in instruction cache 130. The changed bits in the stored branch instruction affect a prediction of a next branch target address the next time the branch instruction is fetched without affecting the function of the instruction.

A. Initialize Prediction Direction of Branch Instruction as not Taken

In instruction fetch stage 114, processor 104 may fetch a branch instruction 144 from instruction cache 130. In a decode and predict stage 116, processor 104 may predict whether the fetched branch instruction 144 is to be taken or not taken. In an embodiment, processor 104 predicts a direction of branch instruction 144 as being not taken. Processor 104 may predict the direction of branch instruction 144 as being not taken regardless of whether branch instruction 144 is a conditional jump instruction or an unconditional jump instruction.

In an example, for each branch instruction, the compiler may initialize the prediction of the direction of the branch instruction as being not taken. The prediction of the direction of the branch instruction as being not taken may be statically determined by the compiler, and the compiler may initialize each branch instruction as being not taken, regardless of whether the branch instruction is a conditional jump instruction or an unconditional jump instruction.

In an example, branch instruction 144 is a conditional jump instruction, and processor 104 predicts the direction of the conditional jump instruction as being not taken. In an example, branch instruction 144 is an unconditional jump instruction, and processor 104 predicts the direction of the unconditional jump instruction as being not taken.

Predict logic 117 may predict the direction of the branch instruction as being not taken. If branch instruction 114 is not taken, predict logic 117 predicted the direction of the branch instruction correctly. If predict logic 117 mispredicted the direction of the branch instruction, however, and branch instruction 114 is taken, processor 104 may calculate the destination address based on executing the branch instruction. Processor 104 may then determine a partial target address using the destination address.

B. Calculate Partial Target Address

Figure 2:
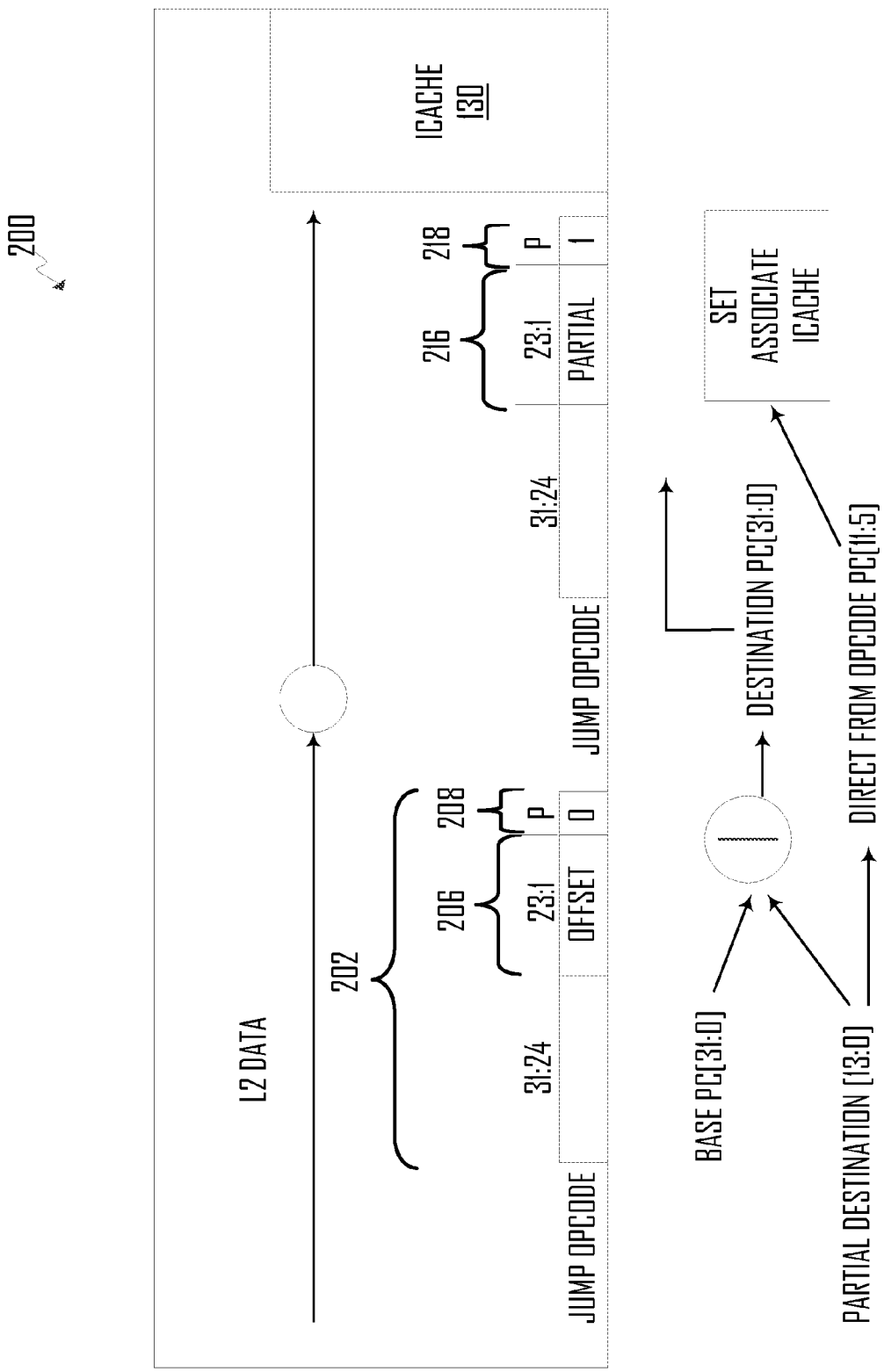
FIG. 2 is a block diagram illustrating a partial target address being calculated and stored in the instruction cache.

FIG. 2 is a block diagram 200 illustrating a partial get address being calculated and stored in the instruction cache.

Diagram 200 includes a 32-bit instruction format 202 including a jump code, a 23-bit offset 206, and a predict bit 208. The predict bit in a conditional branch instruction, such as predict bit 208, may be statically determined prior to loading a program. In an embodiment, the prediction bit predicts the direction of the branch instruction. In an example, all branch instructions are initially predicted by a compiler as being not taken. The prediction bit may be embedded in the operation code In an example, when predict bit 208 has a value of one, the branch instruction is predicted as not taken, and when predict bit 208 has a value of zero, the branch instruction is predicted as taken. In another embodiment, when predict bit 208 has a value of zero, the branch instruction is predicted as not taken, and when predict bit 208 has a value of one, the branch instruction is predicted as taken. Although predict bit 208 is illustrated in FIG. 2 as including one bit, other embodiments having predict bit 208 including more than one bit are within the scope of this disclosure.

To determine a destination address of the jump code, offset 206 my be added to the current program counter. Further, some of the bits in the direct jump destination address may be used to access instruction cache 130. In an embodiment illustrated in FIG. 2, in the whole destination program counter, only bits [11:5] of the partial destination is timing critical. These bits may be retrieved and used to determine the destination address.

Referring to FIG. 1, instruction fetch stage 114 may include an adder that adds the current program counter to the offset to determine fetch the appropriate instruction. It may be beneficial to eliminate this adder. Further, when the branch instruction is mispredicted, the associated speculatively fetched instructions may be flushed from processor pipeline 106 and new instructions may be fetched from the determined branch address. Such misprediction may reduce processor performance and increase power usage.

This disclosure describes a technique that may overcome these disadvantages. For example, by writing the partial target address to instruction cache 130 after a misprediction occurs, it may be unnecessary to include the adder in instruction fetch stage 114. Rather, bimodal predictor 118 may include an adder to calculate the destination address and the adder may be used based on a misprediction, thus eliminating the adder in instruction fetch stage 114. In this way, the amount of area needed to sustain adders may be reduced.

Further, writing the partial target address to instruction cache 130 after a misprediction occurs may have an additional advantage of consuming less power. In particular, rather than predict logic 117 attempting to predict each branch instruction accurately and calculating every possible target address, the prediction of the direction of the branch instruction may be initialized as being not taken, and this may consume less power from the beginning of program execution. Although a misprediction may artificially occur because the direction of the branch instruction is initially set to being not taken (even if the branch instruction is taken or has a high probably of being taken), the slight delay due to the initial mispredict may be tolerable because at some point before predict logic 117 predicts the direction of the branch instruction as being taken, the proper target address for the branch instruction will already have been computed. Accordingly, when predict logic 117 predicts the direction of the branch instruction as being taken, it may be unnecessary to add the current program counter and the offset because the proper target address is already stored in the cache.

After one or more predictions that the direction of the branch is not taken, a misprediction may occur based on the branch instruction actually being taken. Predict logic 117 may calculate the destination address based on executing the branch instruction. In FIG. 2, base program counter [31:0] may be concatenated with partial destination [13:0] to determine the destination address. Further, partial destination PC[11:5] may be used to touch the set associative cache. To access instruction cache 130, it may be unnecessary for processor 104 to know the whole destination address. Rather, processor may access instruction cache 130 by using only the partial target address. The partial target address may be represented by the lower N bits of the base address (e.g., bits 11-5 of the base address) and may be used as an index into instruction cache 130.

Diagram 200 includes a 32-bit instruction format 202 including the jump code, a 23-bit partial target address 216, and predict bit 218. Partial target address 216 may replace offset 206 in instruction cache 130. Further, because the branch instruction was taken, predict bit 218 may be set to one. Accordingly, when the branch instruction is encountered next time, predict logic 117 may predict the direction of the branch instruction as being taken. When the branch instruction is predicted as being taken, the partial target address is stored in instruction cache 130.

III. Change Predicted Direction of Branch Ins

A. Not Taken to Taken

In response to the predicted direction of the branch instruction changing from not taken to taken, processor 104 may replace an offset in an instruction cache with the partial target address. The direction of the branch instruction may transition from taken to not taken or from not taken to taken for various reasons. In an example, if the branch instruction is actually taken, the predicted direction of the branch instruction becomes or stays at taken. Similarly, if the branch instruction is actually not taken, the predicted direction of the branch instruction becomes or stays at not taken.

The instruction cache may include the proper target address such that when the direction of the branch instruction is eventually predicted as being taken, the proper target address may be retrieved from the cache and used. In this way, it may be unnecessary to calculate the proper target address when predict logic 117 predicts the direction of the branch instruction as being taken. Accordingly, the penalty of using the adder to add the current program counter and the offset is not incurred when predict logic 117 predicts the direction of the branch instruction as being taken.

B. Taken to not Taken

After the branch instruction has been changed to taken, it may be changed back to not taken. In an embodiment, in response to the predicted direction of the branch instruction changing from taken to not taken, processor 104 replaces the partial target address in the instruction cache with the offset.

The offset may be recalculated by subtracting the program counter from the destination address. In response to the predicted direction of the branch instruction changing from not taken to taken, the destination address may be known. Further, the value of the current program counter may be known. Thus, the offset may be determined based on knowing the current value of the program counter and knowing the destination address. Further, it may be unnecessary to store both the offset and the partial target address in the cache because the offset and/or partial target address may be recalculated based on knowing the value of the current program counter and destination address.

C. Maintain the Cache

The cache may include the offset or the partial target address. It may be desirable to keep track of which value is in the cache so that values do not improperly overwrite the offset value and/or partial target address in the cache. For example, in response to the predicted direction of the branch instruction maintaining its state, it may be undesirable to add the base address again to the value in the cache. In particular, in response to the predicted direction of the branch instruction changing from not taken to taken, an offset in an instruction cache is replaced with the partial target address. The partial target address is the sum of the current program counter and the offset. When the predicted direction of the branch instruction changes again from not taken to taken, it may be undesirable to perform this action again because an incorrect value would be placed in the cache (e.g., current program counter+current program counter+offset).

The indication of whether the cache includes the offset or the partial target address may be implemented in various ways. For example, in an embodiment; the branch instruction may include a separate bit that indicates whether the cache has been updated with the partial target address. In an example, the bit may be set to 0 when the cache includes the offset and may be set to 1 when the cache includes the partial target address. When the state transitions from not taken to taken, the bit may be set to 1. When the state transitions from taken to not taken, the bit may already be set, indicating that the cache already includes the correct partial target address. Accordingly, the cache may stay as is.

In another embodiment, processor 104 stores a register the bit indicating whether the cache has been updated with the partial target address, in another embodiment, processor 104 stores in main memory the bit indicating whether the cache has been updated with the partial target address.

D. Bimodal Prediction

In an embodiment, decode and predict stage 116 includes a finite state machine implementation of bimodal predictor circuit 118.

Figure 3:
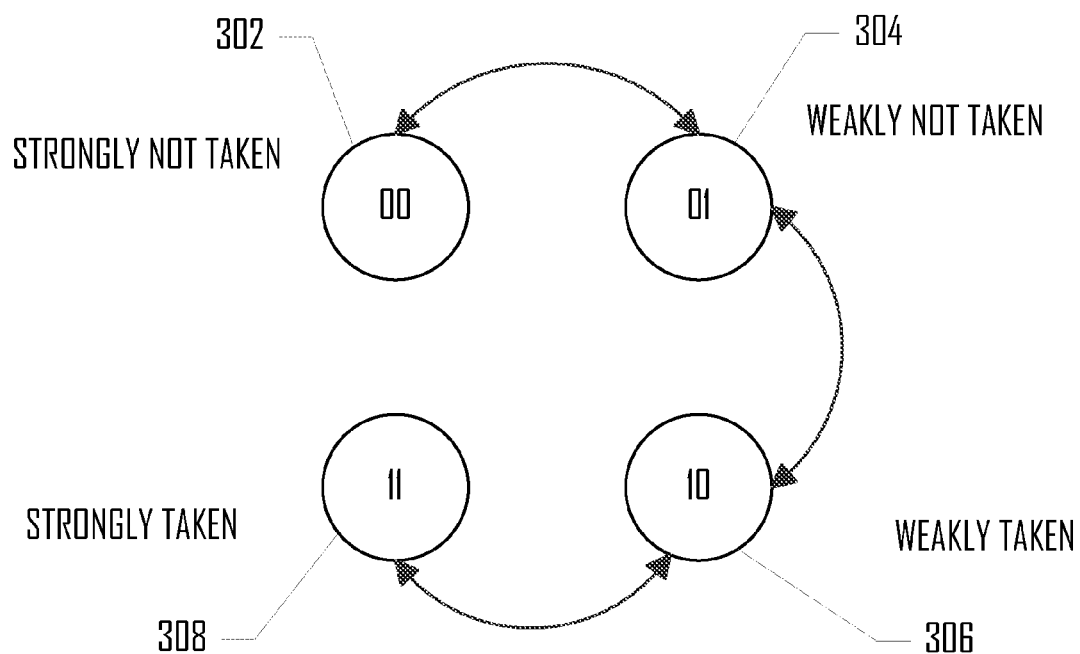
FIG. 3 is an illustration of a finite state machine implementation, according to an embodiment.

FIG. 3 is an illustration of a finite state machine implementation, according to an embodiment. In an example; a branch instruction includes prediction bit 208 and a Q bit (not shown) that may be set to a one value to indicate a strong prediction, and to a zero value to indicate a weak prediction. An initial or default setting for the Q bit may be zero, for example. Both of the bimodal predictor bits may be statically determined by an analysis of a program and specified in the branch instruction prior to executing the program.

In an example, the branch instruction is initiated in a strongly not taken state ("00") 302. If the branch instruction is taken, the branch instruction may enter a weakly not taken state ("01") 304. If the branch instruction is not taken, however, the branch instruction may maintain its state. From the weakly not taken state, if the branch instruction is taken, the branch instruction may enter a weakly taken state ("10") 306. If the branch instruction is not taken, however, the branch instruction may enter a strongly not taken state ("00") 302, and so on. Similarly, from the weakly taken state, if the branch instruction is taken, the branch instruction may enter a strongly taken state ("11") 308. If the branch instruction is not taken, however, the branch instruction may enter the weakly not taken state ("01") 304. Similarly, from the strongly taken state, if the branch instruction is taken, the branch instruction may maintain its state. If the branch instruction is not taken, however, the branch instruction may enter a weakly taken state ("10") 306.

These bits may be embedded in the operation code, and the bimodal prediction bits in the retrieved branch instruction may be used in decode and predict stage 116 to predict whether the fetched conditional branch instruction is to be taken or not taken. Further instructions may be speculatively fetched based on the prediction.

In an embodiment, when the predicted direction of the branch instruction changes from not taken to taken, the offset in the instruction cache is replaced with the partial target address. Further, when the predicted direction of the branch instruction changes from taken to not taken, the partial target address in the instruction cache is replaced with the offset. In this embodiment, before the offset replaces the partial target address, or vice versa, a state transition from taken to not taken (or vice versa) occurred. Accordingly, when the state changes from weakly not taken to strongly not taken (or vice versa) or changes from weakly taken to strongly taken, the offset in the instruction cache is not replaced with the partial target address and the partial target address in the instruction cache is not replaced with the offset.

IV. Example Method

Figure 4:
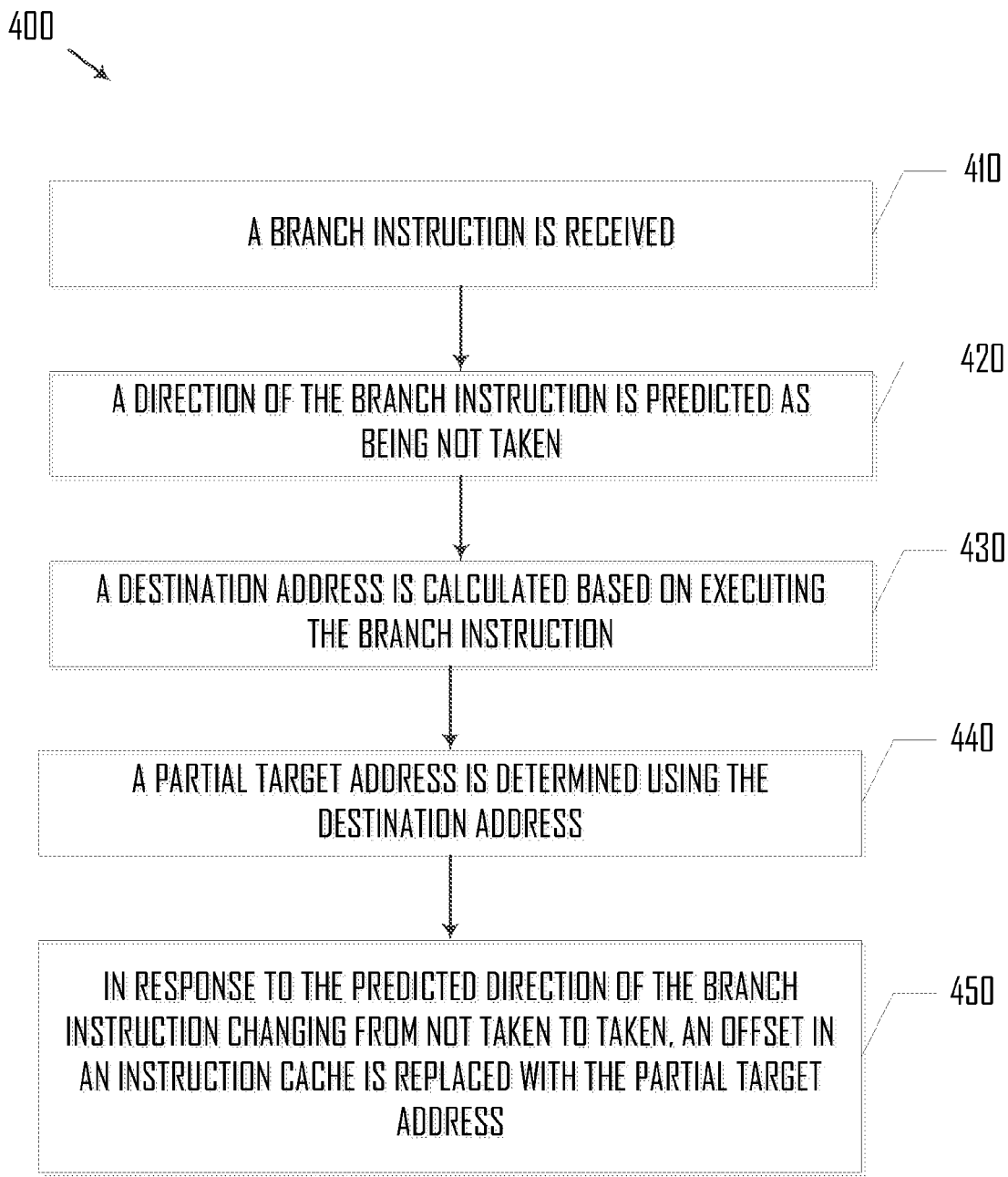
FIG. 4 is a flowchart illustrating a method of storing a partial target address in an instruction cache, according to an embodiment.

FIG. 4 is a flowchart illustrating a method 400 of storing a partial target address in an instruction cache, according to an embodiment. Method 400 is not meant to be limiting and may be used in other applications.

Method 400 includes steps 410-450. In a step 410, a branch instruction is received. In FIG. 1, instruction fetch 114 may receive a branch instruction. In an example, the branch instruction is a conditional jump instruction. In another example, the branch instruction is an unconditional jump instruction.

In a step 420, a direction of the branch instruction is predicted as being not taken. Predict logic 217 may predict a direction of the branch instruction as being not taken. The branch instruction may include a bit that indicates whether or not the branch instruction is predicted as being taken or not taken. For example, in FIG. 2, predict bits 208 and 218 may indicate whether or not the branch instruction is predicted as being taken or not taken. The compiler may determine this and place this prediction in the branch instruction. In an embodiment, all branch instructions are predicted as being not taken. If the branch instruction was not taken, then predict logic 217 was correct and program flow should continue. If the branch was taken, then predict logic 217 was incorrect and the destination address should be calculated.

In a step 430, a destination address is calculated based on executing the branch instruction. Bimodal predictor 118 may calculate a destination address based on executing the branch instruction. When predict logic 117 incorrectly mispredicts, the destination address is calculated to determine the correct address that stores the next instruction in the program.

In a step 440, a partial target address is determined using the destination address. Bimodal predictor 118 may determine a partial target address using the destination address. In an example, the partial target address may be a particular number of bits in the destination address.

In a step 450, in response to the predicted direction of the branch instruction changing from not taken to taken, an offset in an instruction cache is replaced with the partial target address. In an example, in response to the predicted direction of the branch instruction changing from not taken to taken, bimodal predictor 118 may replace an offset in an instruction cache with the partial target address. In FIG. 2, partial target address 216 my replace offset 206 in the jump opcode. The jump opcode storing partial target address 216 may be stored in the cache. When the direction of the branch instruction is predicted as being taken, the jump opcode storing partial target address 216 may be retrieved from the cache and used to determine the destination address.

It is also understood that additional method steps may be performed before, during, or after steps 410-450 discussed above. For example, method 400 may include steps of splitting an instruction into a plurality of phases and executing the instruction in the plurality of phases. It is also understood that one or more of the steps of method 500 described herein may be omitted, combined, or performed in a different sequence as desired.

V. Example Wireless Device

Embodiments may be suitable employed in any processor system supporting branch prediction and supporting a memory hierarchy having one or more caches.

Figure 5:
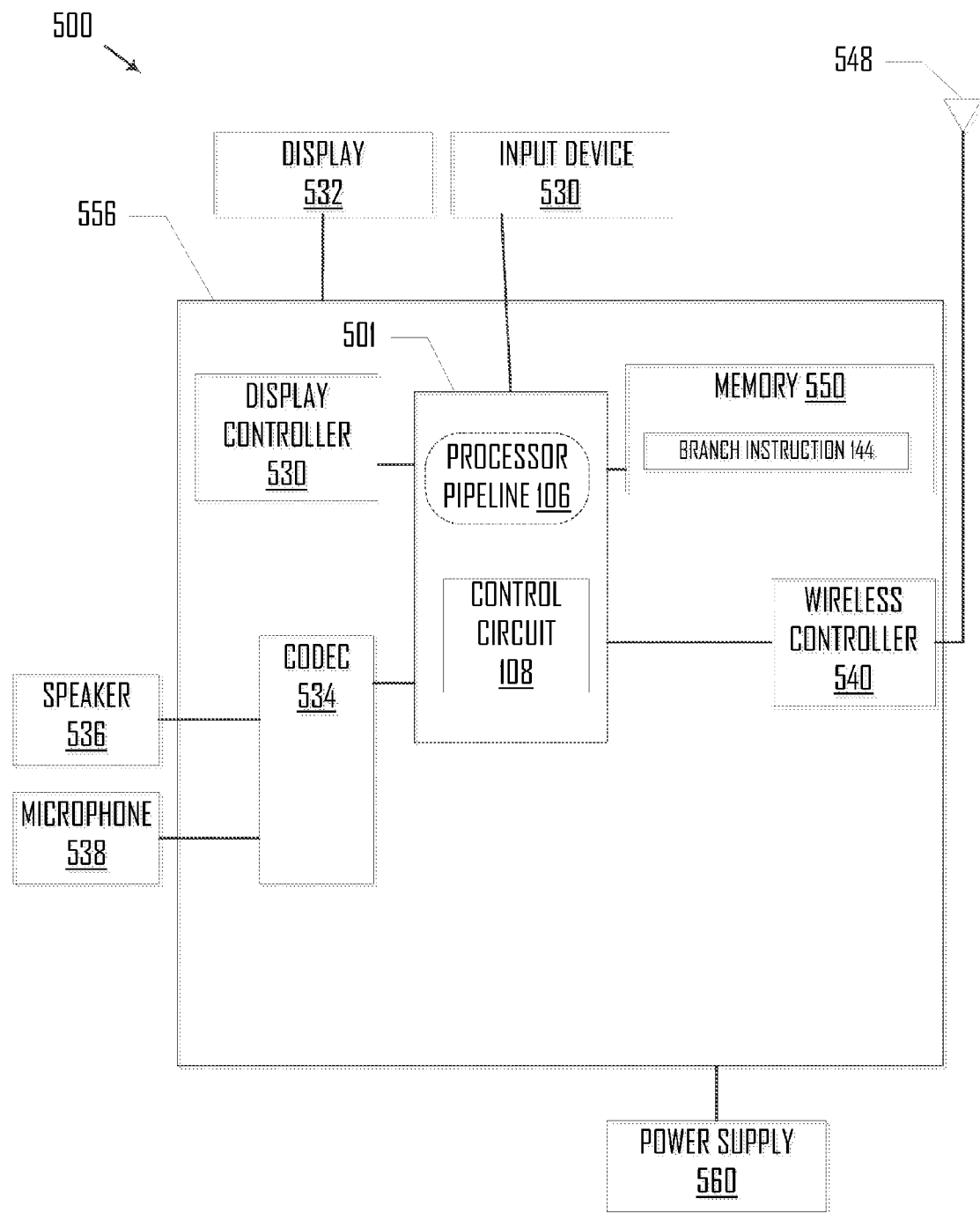
FIG. 5 is a block diagram illustrating a wireless device including a digital signal processor, according to an embodiment.

FIG. 5 is a block diagram illustrating a wireless device 500 including a digital signal processor, according to an embodiment. Device 500 includes a processor, such as a digital signal processor (DSP) 501 to process one or more instructions. DSP 501 may include processor pipeline 106 and control circuit 108, and a memory 550 may include branch instruction 144. In an example, DSP 501 processes branch instruction 144 according to FIG. 1 and the method of FIG. 4, or any combination thereof.

FIG. 5 also shows a display controller 530 that is coupled to DSP 501 and to a display 532. A coder/decoder (CODEC) 534 may also be coupled to DSP 501. A speaker 536 and a microphone 538 may be coupled to CODEC 534. Additionally, a wireless controller 540 may be coupled to DSP 501 and to a wireless antenna 548. In an embodiment, DSP 501, display controller 532, memory 550, CODEC 534, and wireless controller 540 are included in a system-in-package or system-on-chip device 556.

In an embodiment, input device 530 and a power supply 560 are coupled to system-on-chip device 556. Moreover, in an embodiment, as illustrated in FIG. 5, display 528, input device 530, speaker 536, microphone 538, wireless antenna 548, and power supply 560 are external to system-on-chip device 556. Each of display 532, input device 530, speaker 536, microphone 538, wireless antenna 548, and power supply 560 may be coupled to a component of system-on-chip device 556, such as an interface or a controller.

Those of skill would further appreciate that the various illustrative logical blocks, configurations, modules, circuits, and steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims. Thus, the present disclosure is limited only by the claims.

What is claimed is:

1. A method of storing a partial target address in an instruction cache, comprising:
   receiving a branch instruction from an instruction cache;
   predicting a direction of the branch instruction as being not taken;
   calculating a destination address based on executing the branch instruction;
   determining a partial target address using the destination address; and
   in response to the predicted direction of the branch instruction changing from not taken to taken, replacing an offset in the branch instruction in the instruction cache with the partial target address.

2. The method of claim 1, further comprising: in response to the predicted direction of the branch instruction changing from taken to not taken, replacing the partial target address in the branch instruction in the instruction cache with the offset.

3. The method of claim 1, further comprising:
in response to replacing the offset in the branch instruction in the instruction cache with the partial target address, setting a bit in the branch instruction; and
when the bit is set in the branch instruction and the predicted direction of the branch instruction changes from not taken to taken, using the partial target address in the branch instruction in the instruction cache.

4. The method of claim 1, wherein receiving the branch instruction comprises receiving a conditional jump instruction.

5. The method of claim 1, wherein receiving the branch instruction comprises receiving an unconditional jump instruction.

6. The method of claim 1, wherein the prediction of the direction of the branch instruction as being not taken is statically determined by a compiler, and the compiler initializes each branch instruction as being not taken.

7. The method of claim 1, wherein receiving the branch instruction comprises receiving a prediction bit that predicts the direction of the branch instruction.

8. An apparatus for storing a partial target address in an instruction cache, comprising:
a processor that is operable to:
receive a branch instruction from an instruction cache;
predict a direction of the branch instruction as being not taken;
calculate a destination address based on executing the branch instruction;
determine a partial target address using the destination address; and
in response to the predicted direction of the branch instruction changing from not taken to taken, replace an offset in the branch instruction in the instruction cache with the partial target address.

9. The apparatus of claim 8, wherein the processor is further operable to, in response to the predicted direction of the branch instruction changing from taken to not taken, replace the partial target address in the branch instruction in the instruction cache with the offset.

10. The apparatus of claim 8, wherein the processor is further operable to:
in response to replacing the offset in the branch instruction in the instruction cache with the partial target address, set a bit in the branch instruction; and
when the bit is set in the branch instruction and the predicted direction of the branch instruction changes from not taken to taken, use the partial target address in the instruction cache.

11. The apparatus of claim 8, wherein the processor is operable to receive a conditional jump instruction.

12. The apparatus of claim 8, wherein the processor is operable to receive an unconditional jump instruction.

13. The apparatus of claim 8, wherein a compiler statically initializes the prediction of the direction of the branch instruction as being not taken.

14. The apparatus of claim 8, wherein the processor is operable to receive a prediction bit that predicts the direction of the branch instruction.

15. A non-transitory computer-readable medium having stored thereon computer-executable instructions for performing operations, comprising:
receiving a branch instruction from an instruction cache;
predicting a direction of the branch instruction as being not taken;
calculating a destination address based on executing the branch instruction;
determining a partial target address using the destination address; and
in response to the predicted direction of the branch instruction changing from not taken to taken, replacing an offset in the branch instruction in the instruction cache with the partial target address.

16. The non-transitory computer-readable medium of claim 15, the operations further comprising, in response to the predicted direction of the branch instruction changing from taken to not taken, replacing the partial target address in the branch instruction in the instruction cache with the offset.

17. The non-transitory computer-readable medium of claim 15, the operations further comprising:
in response to replacing the offset in the branch instruction in the instruction cache with the partial target address, setting a bit in the branch instruction; and
when the bit is set in the branch instruction and the direction of the branch instruction changes from not taken to taken, using the partial target address in the instruction cache.

18. The non-transitory computer-readable medium of claim 15, wherein receiving the branch instruction comprises receiving a conditional jump instruction.

19. The non-transitory computer-readable medium of claim 15, wherein receiving the branch instruction comprises receiving an unconditional jump instruction.

20. An apparatus for storing a partial target address in an instruction cache, comprising:
means for receiving a branch instruction from an instruction cache;
means for predicting a direction of the branch instruction as being not taken;
means for calculating a destination address based on executing the branch instruction;
means for determining a partial target address using the destination address; and
means for, in response to the predicted direction of the branch instruction changing from not taken to taken, replacing an offset in the branch instruction in the instruction cache with the partial target address.

21. The apparatus of claim 20, further comprising means for, in response to the predicted direction of the branch instruction changing from taken to not taken, replacing the partial target address in the branch instruction in the instruction cache with the offset.

22. The apparatus of claim 21, further comprising:
means for, in response to replacing the offset in the branch instruction in the instruction cache with the partial target address, setting a bit in the branch instruction; and
means for, when the bit is set in the branch instruction and the predicted direction of the branch instruction changes from not taken to taken, using the partial target address in the instruction cache.

23. The method of claim 1, further comprising:
predicting a direction of a next branch instruction as being taken; and
in response to the predicted direction of the next branch instruction being taken, retrieving a destination address for the next branch instruction based on a partial target address for the next branch instruction stored in the next branch instruction in the instruction cache.

24. The method of claim 23, comprising in response to the predicted direction of the next branch instruction being taken, retrieving the destination address for the next branch instruction based on the partial target address stored in an opcode of the next branch instruction stored in the instruction cache.

25. The method of claim 23, further comprising, in response to the predicted direction of the next branch instruction being taken, not adding an offset for the next branch instruction to a program counter.

26. The method of claim 2, comprising in response to the predicted direction of the branch instruction changing from taken to not taken, replacing the partial target address in an opcode of the branch instruction in the instruction cache with the offset.

27. The apparatus of claim 8, wherein the processor is further operable to:
   predict a direction of a next branch instruction as being taken; and
   in response to the predicted direction of the next branch instruction being taken, retrieve a destination address for the next branch instruction based on a partial target address for the next branch instruction stored in the next branch instruction in the instruction cache.

28. The apparatus of claim 27, wherein, in response to the predicted direction of the next branch instruction being taken, the processor is operable to retrieve the destination address for the next branch instruction based on the partial target address stored in an opcode of the next branch instruction stored in the instruction cache.

29. The apparatus of claim 27, wherein in response to the predicted direction of the next branch instruction being taken, the processor is further operable to not add an offset for the next branch instruction to a program counter.

30. The apparatus of claim 9, comprising in response to the predicted direction of the branch instruction changing from taken to not taken, replacing the partial target address in an opcode of the branch instruction in the instruction cache with the offset.

\* \* \* \* \*